A. E. BROWN.
TIRE.
APPLICATION FILED DEC. 19, 1919.

1,362,774.

Patented Dec. 21, 1920.

Archie Edwards Brown, Inventor his Attorney

UNITED STATES PATENT OFFICE.

ARCHIE EDWARDS BROWN, OF EL PASO, TEXAS.

TIRE.

1,362,774.   Specification of Letters Patent.   Patented Dec. 21, 1920.

Application filed December 19, 1919. Serial No. 345,962.

*To all whom it may concern:*

Be it known that I, ARCHIE EDWARDS BROWN, a citizen of the United States, residing at El Paso, in the county of El Paso and State of Texas, have invented certain new and useful Improvements in Tires, of which the following is a specification.

My invention relates to an improvement in tires.

The present invention is an improvement on the tire disclosed in Ser. No. 319,490, filed by me in the U. S. Patent Office Aug. 19, 1919, and this invention includes a core of inferior material with or without an internal annular rib, and having tapering reinforced overlapping edges, in connection with an inner tube of substantially the same character and form as that disclosed in the foregoing pending application.

In the accompanying drawings:—

Figure 1:
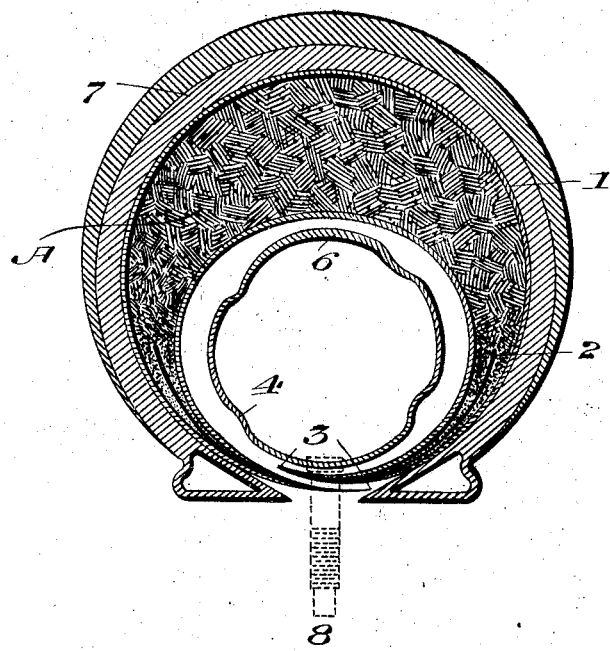
Figure 1 is a section showing the parts in position and the tire inflated.
Figure 2:
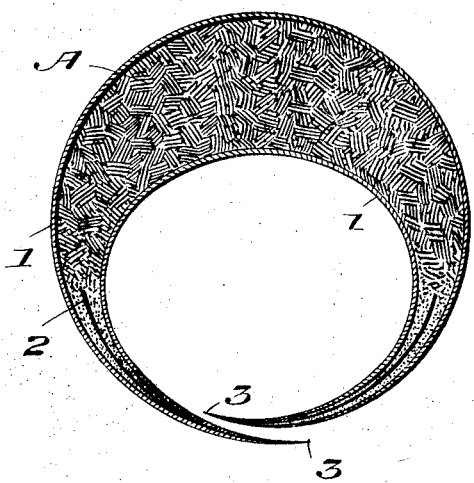
Fig. 2 is a view of the core.

A, represents the core, preferably made of old ground rubber tubes and casings, including the fabric therein, with enough gum added to make it adhere. This is pressed in a mold and given the desired shape, and has a layer of gum or rubber 1 vulcanized on both its inner and outer surfaces.

The edges taper to nothing, and have a fabric 2 embedded midway or equidistant between the exterior and interior surfaces of the tapering ends, which gives strength and elasticity to these tapering ends 3, which latter are of sufficient length to overlap each other for a considerable distance, as shown in both figures of the drawing. This fabric 2 is intended to strengthen the thinner portions of the core, yet the peculiar manner in which the fabric is embedded permits of a maximum elasticity, and also acts as a protection to the inner inflatable tube 4 by interposing itself between the tube 4 and the iron rim of the wheel, and also affords a better frictional hold in the tire.

Figure 3:
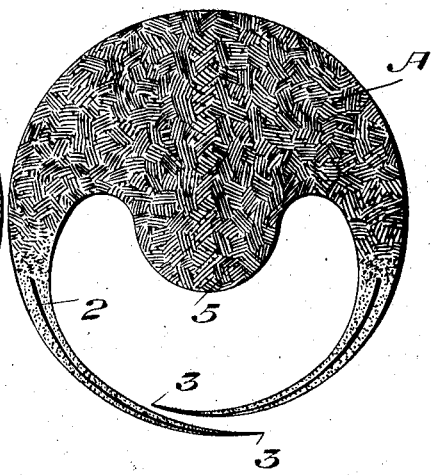
Fig. 3 is a transverse section showing a slightly modified form of core.
Figure 3:
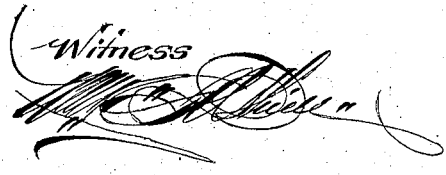
Figure 3:
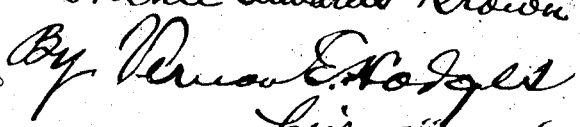

The core may have a rib 5, as indicated in Fig. 3, or it need have no rib as desired.

The inner tube 4 is preferably thickened at the center 6, especially when the core has the internal rib 5.

The numeral 7 represents the usual outer casing; 8 is the tube or nipple through which the tire is inflated.

I claim:

A core for tires comprising a body portion made of inferior material, having its edges tapered and of sufficient length to overlap an equal distance, said tapering edges being reinforced by a fabric arranged midway or equidistant between the exterior and interior surfaces of the tapering edges, said core having a layer of rubber vulcanized on its interior and exterior surfaces.

In testimony whereof I affix my signature.

ARCHIE EDWARDS BROWN.